United States Patent
Goto et al.

(10) Patent No.: US 6,883,949 B2
(45) Date of Patent: Apr. 26, 2005

(54) APPARATUS, METHOD AND ARTICLE OF MANUFACTURE FOR A LIGHT PIPE AND LAMP ASSEMBLY

(75) Inventors: Kazuhiro Goto, Markahm (CA); Andras Gyimes, Toronto (CA); Ronald Charles Du Pont, Oakville (CA); Dragos Luca, Toronto (CA)

(73) Assignee: Tyco Electronics Canada Ltd., Markham (CA)

( * ) Notice: Subject to any disclaimer, the term of this patent is extended or adjusted under 35 U.S.C. 154(b) by 0 days.

(21) Appl. No.: 10/246,184

(22) Filed: Sep. 17, 2002

(65) Prior Publication Data

US 2004/0052089 A1 Mar. 18, 2004

(51) Int. Cl.⁷ ................................................ B60Q 3/00
(52) U.S. Cl. .................... 362/551; 362/31; 362/476; 362/555; 362/560
(58) Field of Search ......................... 362/31, 476, 581, 362/551, 555, 560, 478

(56) References Cited

U.S. PATENT DOCUMENTS

| | | | |
|---|---|---|---|
| 5,678,914 A | 10/1997 | Dealey et al. | 362/32 |
| 5,680,496 A | 10/1997 | Burkitt, III et al. | 385/100 |
| 5,810,463 A | 9/1998 | Kawahara et al. | 362/31 |
| 6,304,702 B1 | 10/2001 | Potucek et al. | 385/115 |
| 6,402,353 B1 | 6/2002 | Dealey, Jr. et al. | 362/478 |
| 6,657,683 B1 * | 12/2003 | Richard | 349/63 |

FOREIGN PATENT DOCUMENTS

| | | | | |
|---|---|---|---|---|
| DE | 100 31 527 A1 | 1/2002 | | B60Q/3/02 |
| DE | 100 32 927 A1 | 1/2002 | | F21V/8/00 |

\* cited by examiner

*Primary Examiner*—Stephen Husar
*Assistant Examiner*—Anabel Ton (57) ABSTRACT

A light pipe having one or more exterior protrusions that function as a secondary light source and an alignment component. The one or more exterior protrusions may provide a secondary light source by reflecting light from a primary light source. The one or more exterior protrusions also may function to align the light pipe with a lamp assembly or an object on which the light pipe is mounted. Further, a lamp assembly having a light pipe receiving portion, with one or more slits to allow an opening to expand upon insertion of the light pipe, and to provide a retention force upon contraction.

39 Claims, 6 Drawing Sheets

FIG. 9

APPARATUS, METHOD AND ARTICLE OF MANUFACTURE FOR A LIGHT PIPE AND LAMP ASSEMBLY

FIELD OF THE INVENTION

The invention relates to light pipes and lamp assemblies used therewith.

BACKGROUND OF THE INVENTION

Light pipes are typically cylindrical, transparent structures through which light is channeled longitudinally by total internal reflection. Total internal reflection occurs when light is transmitted at a critical angle from one medium to another medium with a lower index of refraction. At the critical angle, light is reflected back into the medium of higher refractive index instead of being refracted by the change in media and traveling through the second medium. All or some of light transmitted through a light pipe may undergo total internal reflection. Light not internally reflected is emitted from the light pipe along the length of the light pipe.

Light pipes transmit light generated by a light source. The light source is usually contained in a lamp assembly to which the light pipe is fastened. A typical lamp assembly includes a housing that contains a light source such as a light emitting diode (LED), necessary electrical components to supply power to the light source, and a means for fastening the light pipe to the lamp assembly.

In many light pipe applications the space to accommodate the light pipe and associated lamp assembly is limited. Interior automobile lighting is an example of such an application. Therefore, a need exists to minimize the dimensions of lighting assemblies that include light pipes.

It is also desirable to maximize the light pipe output. Efforts to maximize output are typically directed to minimizing light degradation. Further improvements to maximize light pipe output are desirable, particularly for applications associated with limited space.

Providing a secure connection between the light pipe and lamp assembly is a further design consideration. Poor connections reduce reliability of the device. Because a light pipe typically has a smooth, cylindrical exterior, it may easily disconnect from a lamp assembly. Clamps, epoxies or other securing mechanisms require additional fabrication steps or components. Therefore, a need exists for a secure connection that is easily implemented without incurring added cost or time.

SUMMARY OF THE INVENTION

Embodiments of the invention provide a light pipe having an exterior protrusion that functions as a secondary light source and an alignment component. The exterior protrusion may provide a secondary light source by reflecting light from a primary light source. The exterior protrusion also may function to align the light pipe with a lamp assembly or an object on which the light pipe is mounted.

Embodiments of the invention further provide a lamp assembly for use with a light pipe. The lamp assembly has an opening to accommodate the light pipe. One or more slits allow the opening to increase in size upon insertion of the light pipe. Once the light pipe is inserted, the lamp assembly maintains a retention force on the light pipe, thereby securing it to the lamp assembly.

Further disclosed is a lighting assembly comprising the disclosed light pipe or lamp assembly.

DESCRIPTION OF THE DRAWINGS

The invention is best understood from the following detailed description when read with the accompanying drawings.

DETAILED DESCRIPTION

Embodiments of the invention include an exterior protrusion from a light pipe section, which provides a secondary light source and further functions as an alignment component.

Figure 1:
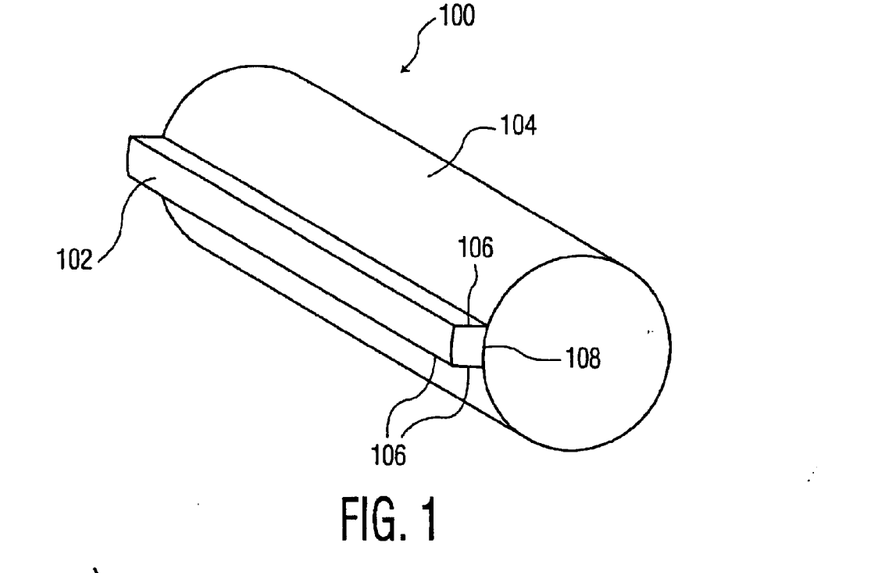
FIG. 1 depicts a light pipe according to an illustrative embodiment of the invention.

FIG. 1 depicts a light pipe 100 according to an illustrative embodiment of the invention. Light pipe 100 includes light pipe section 104 through which light is transmitted, and exterior protrusion 102. Light pipe 100 is used in conjunction with a light source that radiates light that is transmitted through the light pipe. (As used herein "light source" includes one or more individual sources. For example, a light source may be a single light emitting diode or included a plurality of light emitting diodes. A single light source may include more than one type of light generating component.) An exterior protrusion may function as a secondary light source by reflecting and scattering light from the primary light source. An added advantage of an exterior protrusion is that it may be used to align the light pipe with a lamp assembly or with the object to which it is mounted.

"Light pipe section" as used herein refers to a portion of a light pipe from which an external protrusion or other component may project. Accordingly, if there are no projections, the "light pipe" may consist entirely of the "light pipe section."

A light pipe section in accordance with embodiments of the invention can be generally cylindrical or may have any shape compatible with the use and operation of the light pipe. A light pipe section can be comprised of clear acrylic or any material that allows transmission of light therethrough. Light pipe materials are preferably non-yellowing and durable. A current advantage of Acrylic is that it is a cost effective material and provides optimal performance. Polycarbonate is another example of a light pipe material, however, it can be prone to discoloration and have a lower light transmission than acrylic.

A light pipe in accordance with embodiments of the invention can be manufactured by extrusion; however, other suitable manufacturing techniques can be employed as well where desired. For example, it is possible to have an exterior protrusion as a separate component fastened to a light pipe section. In an exemplary embodiment of the invention, an exterior protrusion is co-extruded with the light pipe section.

An exterior protrusion in accordance with embodiments of the invention may be used to align the light pipe with a lamp assembly. The lamp assembly preferably includes a component corresponding to a protrusion to provide a means of alignment. A protrusion may also be used where desired to align the light pipe with an object on which it is mounted. Proper alignment may facilitate maximum light utilization and transmission. The corresponding lamp assembly component may be, for example, and without limitation, a bracket or a groove.

An exterior protrusion preferably comprises a reflective color, such as white or any other reflective color. Color or reflective quality may also, where desired, be incorporated into the exterior protrusion material or be applied to the exterior protrusion. Preferably the material and color of the exterior protrusion are selected to provide a high level of light reflection and scattering. The entire protrusion may be reflective or the protrusion may only have one or more reflective surfaces or portions. For example, the interface between a light pipe section and an exterior protrusion may be reflective toward the light pipe section. In a further embodiment, an outer surface of a substantially clear exterior protrusion may have a reflective coating that reflects light toward a light pipe section. Embodiments of the invention should be broadly construed to encompass light pipes where the exterior protrusion is the same material as the light pipe section, although preferably a different color, and light pipes where the exterior protrusion is comprised of a different material than the light pipe section.

An exterior protrusion may have any shape, and preferably a shape that is compatible with the use and operation of the light pipe. For example, the amount of light desired to be reflected or scattered may be a consideration in a choice of shape. Additionally, an alignment design or mechanism may also have a bearing on the chosen shape.

In an exemplary embodiment illustrated in FIG. 1, the exterior protrusion is generally rectangular in cross-section. This embodiment comprises three generally planar sides 106 and one generally arcuate side 108. In the case where the exterior protrusion is a separate component from the light pipe section, one or more surfaces of the exterior protrusion are preferably adapted to mount with an exterior surface of the light pipe section. For example, in the present embodiment, where the exterior protrusion is substantially rectangular, the surface of the generally arcuate side 108 serves as an attachment surface.

An exterior protrusion may extend the length of a light pipe section, or may occupy one or more portions of the length of the light pipe section. Multiple or segmented exterior protrusions may also be provided, such as to provide a unique lighting effect. The exterior protrusion may also be partially embedded in the light pipe section where desired. One or more protrusions may be used as well. Finally, one or more embedded reflective strips (or other shaped reflective components) may be used with one or more exterior protrusions.

The length of an exterior protrusion preferably will affect the amount of reflection provided by it. In general, the greater the surface area of the protrusion facing the remainder of the light pipe, the greater the amount of reflection and scattering.

The width of a protrusion surface from which light is reflected or scattered may also affect the amount of light reaching the distal end of the light pipe (i.e. the end furthest from the primary light source.) Light preferably travels along the light pipe because of total internal reflection. A reflective or scattering surface preferably interferes with the total internal reflection causing light to be emitted before reaching the end of the light pipe. If the surface is too wide, a greater amount of light is emitted from the light pipe portion closest to the primary light source. This reduces the amount of light emitted from the distal end of the light pipe. The preferable exterior protrusion width is usually a function of the length of the light pipe. The shorter the pipe, the wider the exterior protrusion can be without adversely affecting the amount of light emitted from the distal end of the light pipe. In an illustrative embodiment, the width of the reflective surface is preferably less than a distance extending 180° around the light pipe section. Beyond that amount, limited light would exit the light pipe. The efficiency may also be unreasonably low, because a large amount of light energy may be lost due to excessive reflection within the light pipe.

The preferable diameter or other cross-sectional dimensions of the light pipe are dependant on the light pipe's application. Interior applications preferably utilize 5 mm diameter light pipes and exterior applications preferably utilize 9 to 10 mm diameter light pipes, although, as should be understood, other diameters can be used where desired.

Figure 2:
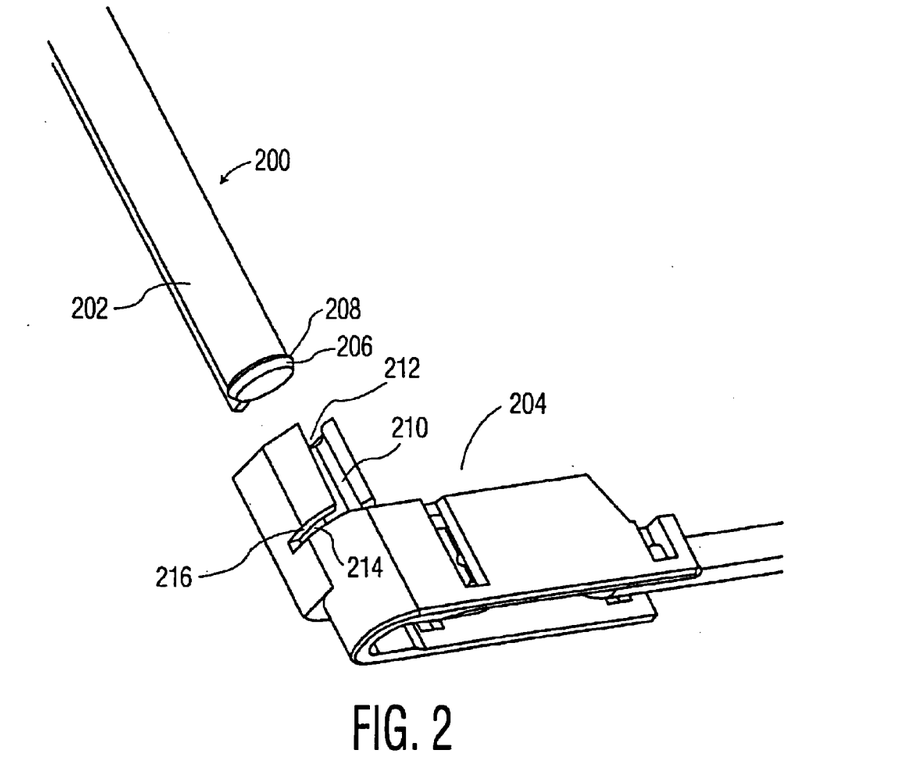
FIG. 2 depicts a light pipe and a lamp assembly according to illustrative embodiments of the invention.

FIG. 2 depicts a light pipe 200 and a lamp assembly 204, according to illustrative embodiments of the invention. Light pipe 200 has a tapered end 206, which may facilitate insertion of light pipe 200 into lamp assembly 204. Tapered end 206 in the illustrative embodiment is shown having a largest diameter greater than that of light pipe section 202. In other embodiments, however, a tapered end need not increase to a size greater than light pipe section 202.

In the present embodiment, lamp assembly 204 has a slit 210 that may function as a securing mechanism, to secure light pipe 200 to lamp assembly 204. As light pipe 200 is inserted into lamp assembly 204, slit 210 preferably widens to allow light pipe 200 to be inserted. Once inserted, lamp assembly 204 exerts a retention force on light pipe 200.

Slit 210 initiates at opening 212 of lamp assembly 204, and preferably extends longitudinally from opening 212 along lamp assembly 204. Additional slits, such as slit 214, may facilitate expansion and contraction of lamp assembly 204. Slits may also extend in directions other than longitudinally from the opening and need not be linear where desired. For example, and without limitation, slits may be curved or zigzagged. For applications where one or more slits serve as a securing mechanism, any shaped slit, any slit position and any number of slits that allow the diameter of the opening to enlarge upon insertion of the light pipe, and retract sufficiently to provide a retention force, are acceptable.

In the present embodiment, at least one interior dimension of the lamp assembly opening is smaller than at least one exterior dimension of the light pipe. When the light pipe is inserted into the lamp assembly, the lamp assembly opening expands sufficiently to accommodate a light pipe. One or more slits allow for this expansion. When a light pipe is inserted into a lamp assembly, the elastic nature of the lamp assembly preferably provides a retention force on the light pipe.

Slits may, additionally or alternatively to providing a securing mechanism, increase light pipe output by providing more openings through which light may pass. This allows a greater length of the light pipe to be used.

Figure 3A:
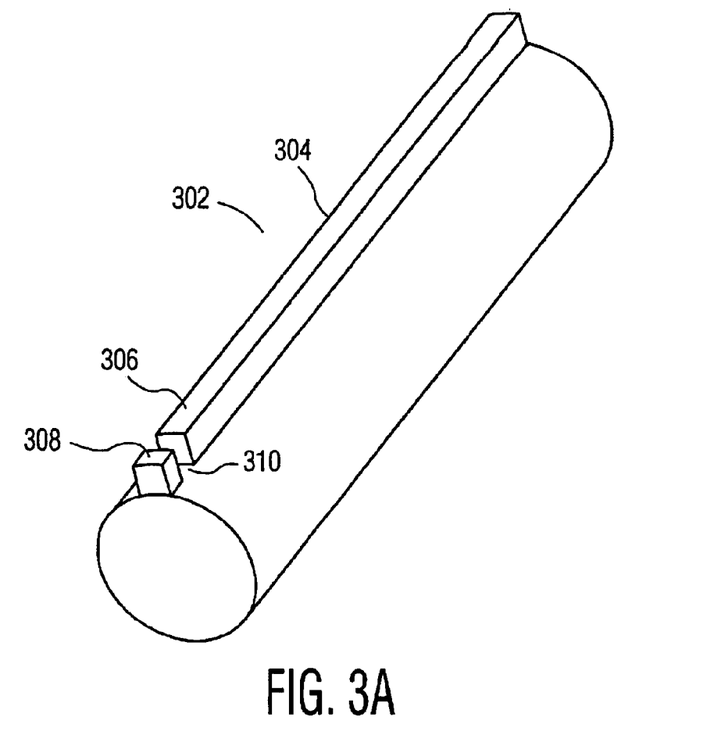
FIGS. 3A and B depict an illustrative embodiment of a mechanism to secure a light pipe to a lamp assembly.
Figure 3B:
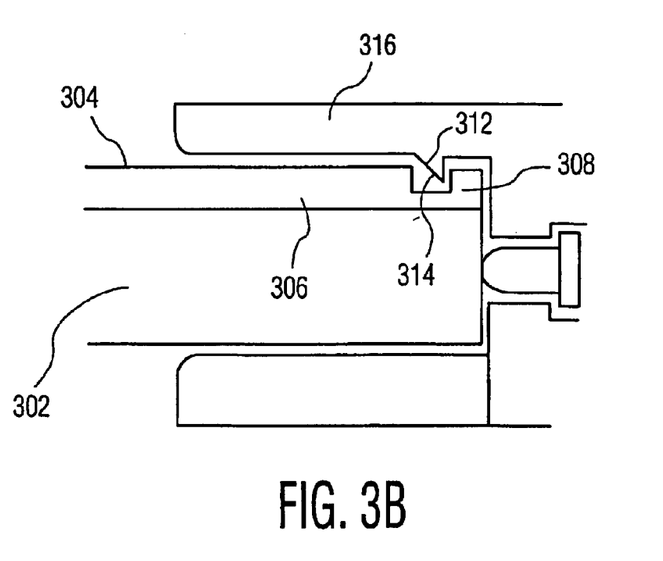
Figure 4A:
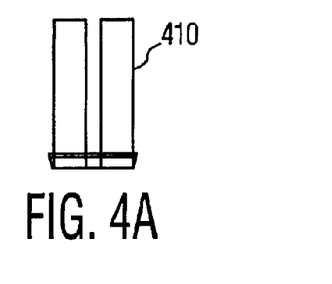
FIGS. 4A–D depict cross-sectional views of parts of a lighting assembly according to illustrative embodiments of the invention.
Figure 4B:
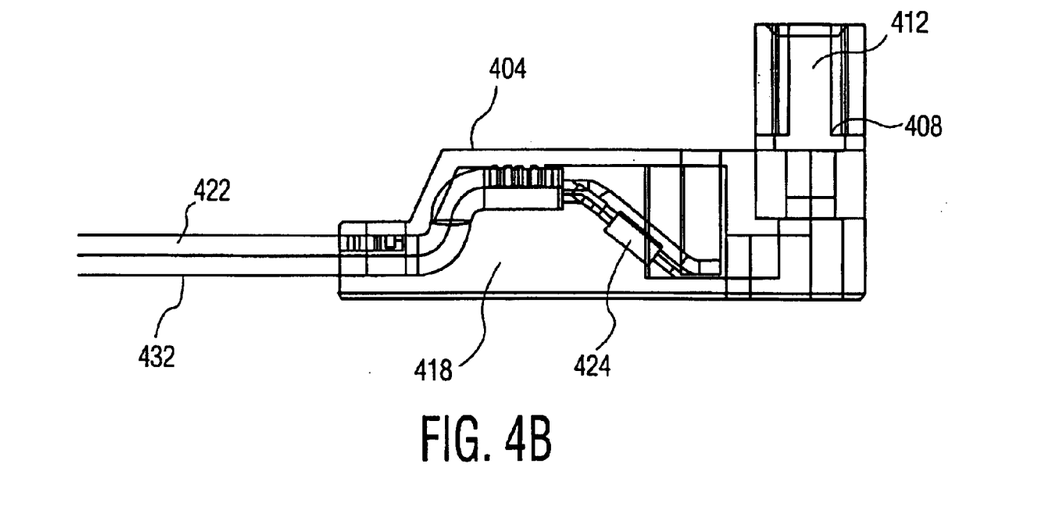
Figure 4C:
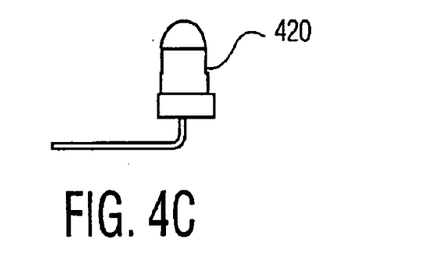
Figure 4D:
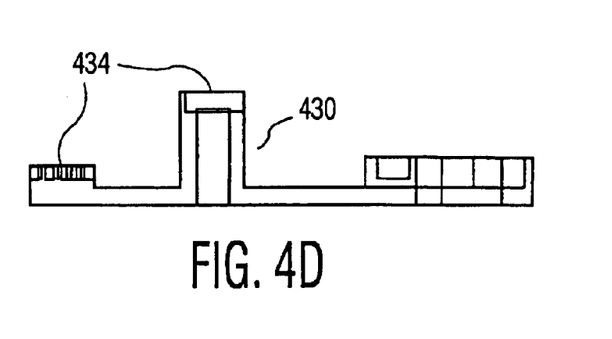

An additional or alternative securing method is illustrated by embodiments depicted in FIGS. 2 and 3. In this embodiment, the light pipe has a lip that catches onto a corresponding lip of the lamp assembly, as the light pipe is inserted a sufficient amount into the lamp assembly. The flexibility and/or elasticity of the lamp assembly material preferably allows the parts to snap into place.

FIG. 2 shows an exemplary embodiment of a securing mechanism. In this embodiment, preferably the largest diameter of tapered portion 206 is greater than the diameter of light pipe section 202, providing a lip 208 that may function to secure light pipe 200 to lamp assembly 204. Lamp assembly slit 214 has an interior lip 216. When light pipe 200 is inserted into lamp assembly 204, slits 210 and 214 allow lamp assembly 204 to expand. When light pipe lip 208 passes beyond lamp assembly interior lip 216, lamp assembly 204 at least partially contracts, thereby securing light pipe 200 to lamp assembly 204.

In other embodiments, a light pipe may have more than one tapered portion, creating a series of lips to allow the light pipe to be secured to a lamp assembly at different distances. This makes the overall dimensions of the lighting assembly adjustable, allowing a single design to be used for numerous applications. In addition, the light pipe may not be tapered and the corresponding lamp assembly lip can include an adjacent tapered portion to facilitate insertion of the light pipe. A lamp assembly may further have a series of lips for adjustment purposes instead of, or in addition to, the light pipe having a series of lips. Tapered portions, or other components forming lips, may be integral with, or separate from, other parts of the light pipe or lamp assembly. For example, a tapered portion may be formed during an extrusion process in which the light pipe section is formed, so that the two parts are integral, or the tapered portion may be a separate piece affixed to the light pipe section.

FIGS. 3A–B depict another illustrative embodiment of a securing mechanism. Light pipe 302 has an exterior protrusion 304. Exterior protrusion 304 is comprised of at least two segments 306 and 308. A gap 310 between segments 306 and 308 provides a lip that can catch on a corresponding lamp assembly lip 312. As shown in FIG. 3B, a lamp assembly 316 has a lip 312 with an angled side 314 to facilitate light pipe 302 sliding into position. In an alternative embodiment, one or more segments of the exterior protrusion can be slanted in a similar manner. Portions of either the lamp assembly or the light pipe, or both, may be slanted in this manner. In general, the slanted surface may be at any angle with respect to the normal to the direction of insertion of the light pipe into the lamp assembly. The side of the normal to which the angle will be located depends on whether the slanted surface is on the light pipe or the lamp assembly. A light pipe and/or a lamp assembly may have one or more lips to allow the light pipe to be inserted by varying amounts, and still be secured into the lamp assembly.

FIGS. 4A–D show cross-sectional views of parts of a lighting assembly according to illustrative embodiments of the invention. The lighting assembly parts include a light pipe 410, lamp assembly 404, light source 420 and wire retention device 430.

Figure 9:
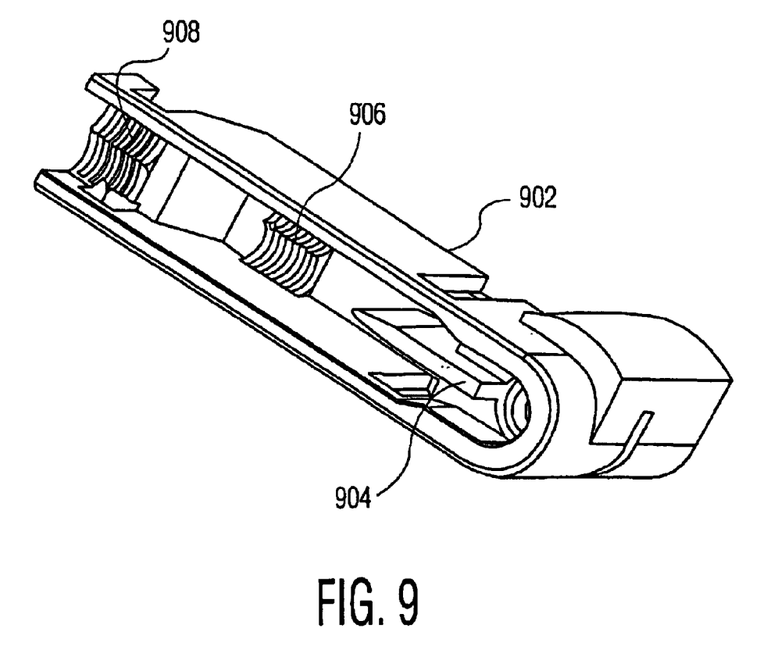
FIG. 9 depicts a lamp assembly cover with a wire separator according to an illustrative embodiment of the invention.

FIG. 4 further depicts electronic components 418 and wire retention device 430 of lamp assembly 404. Electronic components 418 shown in FIG. 4 include a primary lamp source 420, wires 422 and 432 and a resistor 424. Wires and/or other electronic components may be held in place by a wire retention device. Device 430 secures wires 422 and 432 to lamp assembly 404 to diminish the likelihood of wires 422 and 432 disconnecting from the assembly. Wire retention device 430 has one or more pressure components 434. Pressure components secure electronic parts by exerting pressure against them to counter any forces that may cause them to become disconnected. In an exemplary embodiment, there are two pressure components 434 of differing heights to create a kink in wires 422 and 432 for enhanced wire retention. A kink in a wire may reduce forces exerted longitudinally on the wire. As shown in FIG. 9, a perspective view of exemplary pressure components is shown according to an illustrative embodiment of the invention. Pressure components 906 and 908 each have two ridged channels to accommodate wires. The channels and ridges enhance the clamping effect of the pressure components by increasing friction between the wires and the pressure components. The pressure components may have any desired configuration that positions them in direct or indirect contact with, and creates friction between, wires or other electronic components that they secure.

Figure 5:
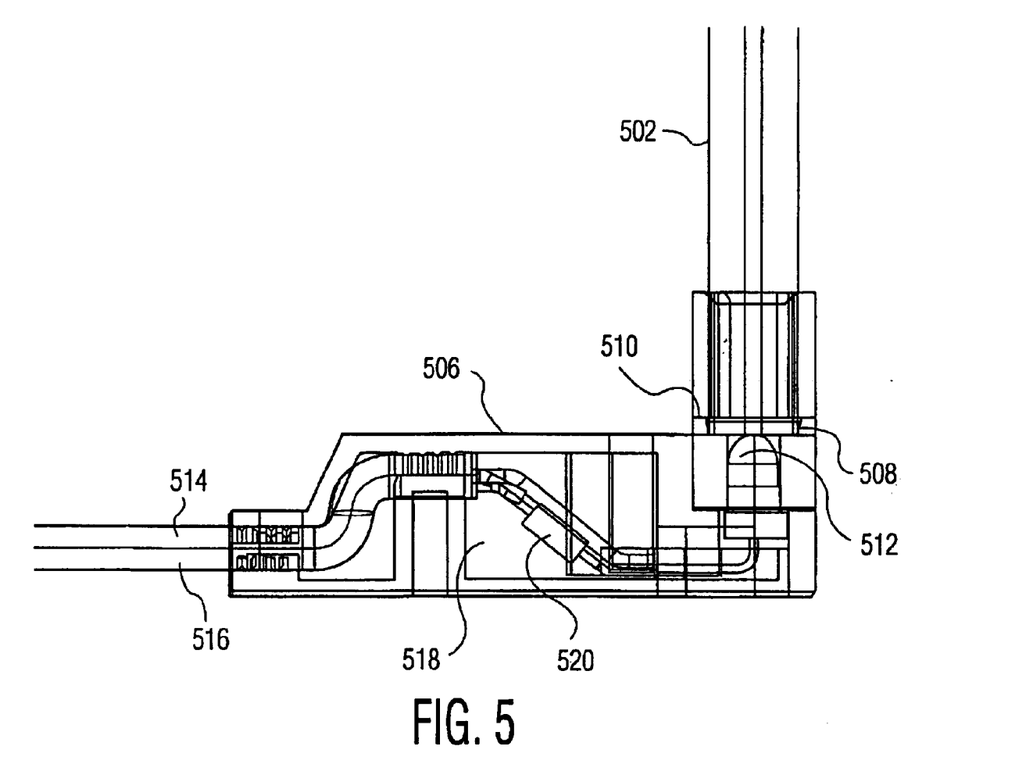
FIG. 5 depicts a cross-sectional view of a light pipe inserted into a lamp assembly according to an illustrative embodiment of the invention.

FIG. 5 depicts a cross-sectional view of a light pipe 502 inserted into a lamp assembly 506 according to an illustrative embodiment of the invention. Light pipe tapered end 508 can be seen inserted beyond an interior lip 510 of lamp assembly 506.

FIG. 5 further depicts primary light source 512, which transmits light through light pipe 502. Primary light source 512 is preferably a light emitting diode. A light emitting diode is relatively small and focused, providing a good choice for interior applications. A halogen lamp can also be used as a light source for other embodiments of the invention; however, the relatively high temperature it emits limits its practicality. Any other suitable light sources can also be used where desired.

FIG. 5 further depicts wires 514 and 516 functionally connected with electronic components 518 of lamp assembly 506. Wire 516 is shown connected to resistor 520. Wire 514 connects to a primary light source 512. Resistor 520 modifies incoming voltage to primary light source 512 to its operating voltage. Any lamp assembly may be used that is compatible with the application of the lighting assembly. For example, lamp assemblies may utilize AC or DC power sources, produce continuous light or intermittent light and include sensors to activate the light source.

Figure 6:
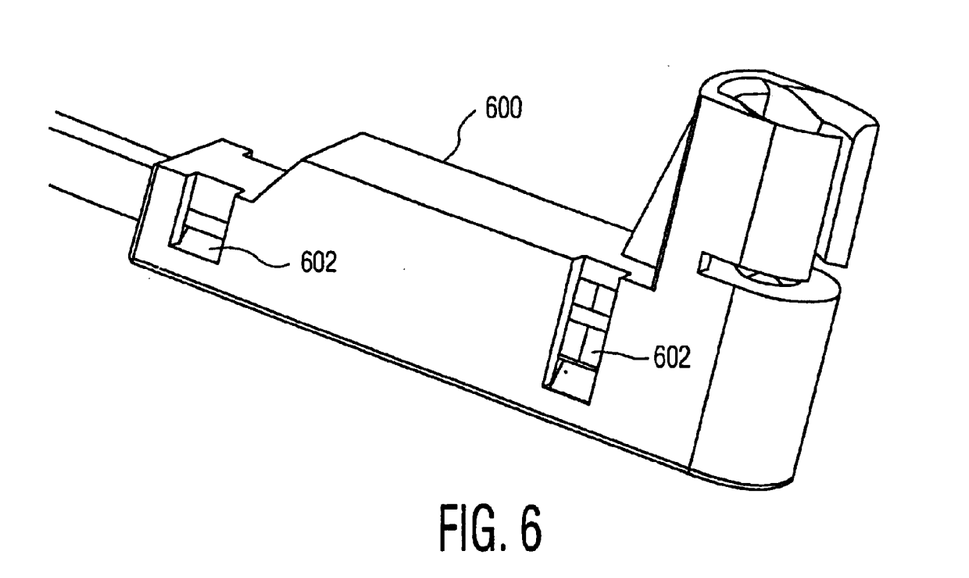
FIG. 6 depicts a lamp assembly according to a further illustrative embodiment of the invention.

FIG. 6 depicts a lamp assembly 600 according to a further illustrative embodiment of the invention. Lamp assembly 600 has latches 602 to secure a cover over lamp assembly 600. In this embodiment, any attachment mechanism may be used to secure a cover to a lamp assembly, provided that it adequately secures the cover to the lamp assembly and does not interfere with the operation or use of the lamp assembly. For example, and without limitation, the latches may be draw larches, such as of the over-center or under-center type. In addition, the latches may be formed as a living hinge integral to the lamp assembly housing and cover. This construction can have an advantage of being cost effective if the latches are formed during the molding of the cover or lamp assembly housing. All or parts of any number of latches can also comprise separate components. In this embodiment, one or more latches may be used as desired.

Figure 7:
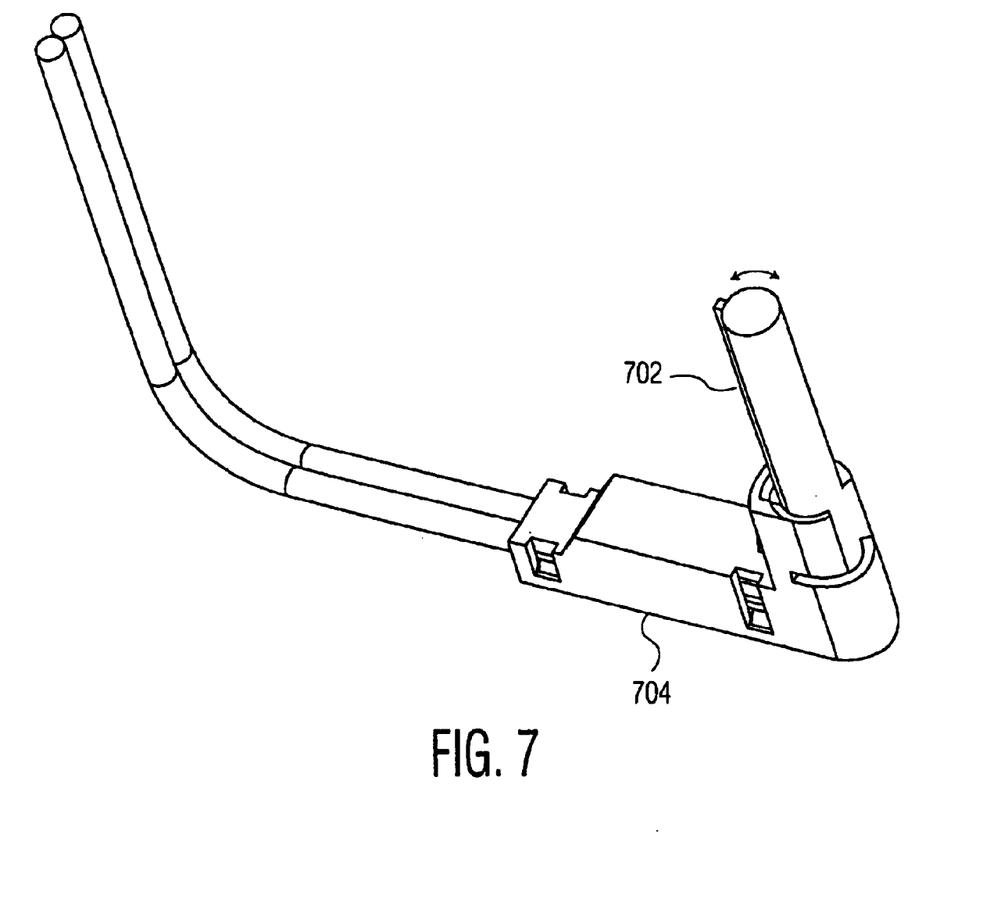
FIG. 7 depicts a light pipe within a lamp assembly according to an illustrative embodiment of the invention.

FIG. 7 depicts a light pipe 702 within a lamp assembly 704 according to an illustrative embodiment of the invention. Light pipe 702 may be rotated within lamp assembly 704. Advantageously, the retention force provided by lamp assembly 704 allows for the rotation in this embodiment, without the necessity for additional components. Additional components related to rotation of the light could also be used, for example to provide incremental rotation. The ability to rotate the light pipe may be desirable to accommodate either right hand or left hand assemblies.

Figure 8:
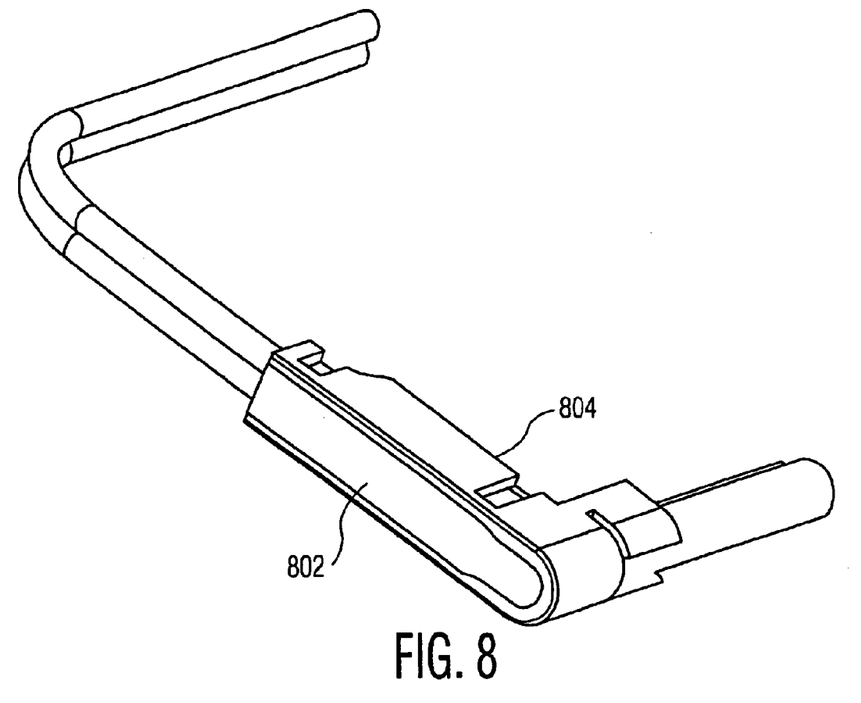
FIG. 8 depicts a lamp assembly cover according to an illustrative embodiment of the invention.

FIG. 8 depicts a lamp assembly cover according to an illustrative embodiment of the invention. Lamp assembly cover 802 may be secured onto lamp assembly 804 to provide protection of lamp assembly 804 and/or for aesthetic purposes. In this embodiment, a cover and a wire retention device may be separate components or comprise a single component.

FIG. 9 depicts a lamp assembly cover 902 showing an optional wire separator 904. Wire separator 904 may be used to facilitate wiring of the lamp assembly. Wire connections to components, such as light emitting diodes, can be situated such that wire separator 904 insulates the devices from other connections. Advantageously, this can eliminate the need for connections to be insulated by other means, thereby eliminating a fabrication step, and thus reducing fabrication time and cost.

A variety of materials may be used for the lamp assembly construction. Materials preferably are elastic enough to allow insertion of the light pipe and provide a sufficient retention force once the light pipe is inserted therein, and/or to expand and retract a sufficient amount to allow a light pipe lip to be secured behind a lamp assembly lip. Examples of suitable materials include, but are not limited to, PBT, Nylons and Delrin®.

In an exemplary embodiment of the lamp assembly, the lamp assembly portion accommodating the light pipe is at an angle to the remainder of the lamp assembly, thereby reducing the maximum dimension of the lamp assembly as compared to a linear configuration. For many applications, the angle is preferably a right angle.

Embodiments of the invention may be particularly suitable for automotive applications and for use with household appliances, although other applications are possible.

While the invention has been described by illustrative embodiments, additional advantages and modifications will occur to those skilled in the art. Therefore, the invention in its broader aspects is not limited to specific details shown and described herein. Modifications, for example, to materials, configurations and sizes may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A light pipe comprising:
   a primary light source; and,
   one or more exterior protrusions, wherein at least one of the one or more exterior protrusions functions as a secondary light source, and wherein at least one of the one or more exterior protrusions is also an alignment component.

2. The light pipe of claim 1 wherein the one or more exterior protrusions extend at least partially along a length of the light pipe.

3. The light pipe of claim 1 wherein the at least one of the one or more exterior protrusions is white in color.

4. The light pipe of claim 1 wherein the one or more exterior protrusions are co-extruded with the light pipe portion from which it protrudes.

5. The light pipe of claim 1 wherein at least one of the one or more exterior protrusions functions as the secondary light source by scattering light from a primary light source.

6. The light pipe of claim 5 wherein the primary light source is a light emitting diode.

7. An apparatus comprising:
   at least one lamp assembly; and
   at least one light pipe including a primary light source and one or more exterior protrusions, wherein at least one of the one or more exterior protrusions functions as a secondary light source, the at least one light pipe further comprising:
   one or more light pipe lips, wherein when the at least one light pipe is inserted into the lamp assembly, the lamp assembly expands to allow at least one of the one or more light pipe lips to pass at least one of one or more lamp assembly lips, so that the lamp assembly at least partially contracts, thereby securing at least one light pipe lip behind at least one lamp assembly lip.

8. The light pipe of claim 7 wherein the one or more light pipe lips are formed on one or more of the one or more exterior protrusions.

9. The light pipe of claim 7 wherein the one or more light pipe lips extend fully around the light pipe.

10. The light pipe of claim 1 wherein at least one of the one or more exterior protrusions functions as an alignment component for alignment with a lamp assembly, by aligning with a corresponding component on the lamp assembly.

11. The light pipe of claim 1 wherein at least one of the one or more exterior protrusions has a width extending less than 180° around a light pipe section.

12. The light pipe of claim 1 wherein the light pipe has a tapered end.

13. The light pipe of claim 8 wherein the one or more light pipe lips are angled with respect to a normal to a direction of insertion of the light pipe into the lamp assembly.

14. A lighting assembly comprising the light pipe of claim 1 and a lamp assembly configured to function with the light pipe.

15. A lighting assembly comprising:
   a light pipe including a primary light source and having an exterior protrusion wherein the protrusion functions as a secondary light source; and
   a lamp assembly comprising:
      an opening to accommodate the light pipe; and
      one or more slits to allow expansion of the opening;
      wherein at least one interior dimension of the opening is smaller than at least one exterior dimension of the light pipe; and
      wherein insertion of the light pipe into the lamp assembly causes the opening to expand sufficiently to accommodate the light pipe and provide a retention force on the light pipe.

16. A lamp assembly for use with a light pipe having one or more lips for securing the light pipe in said lamp assembly, the lamp assembly comprising:
   a receiving portion having one or more lips;
   wherein when the light pipe is inserted into the lamp assembly receiving portion, the lamp assembly receiving portion expands to allow at least one of the one or more light pipe lips to pass at least one of the one or more lamp assembly lips, so that the lamp assembly at least partially contracts, thereby securing at least one light pipe lip behind at least one lamp assembly lip.

17. The lamp assembly of claim 16 wherein the one or more lamp assembly lips are angled so that insertion of the light pipe causes the lamp assembly to expand, so that at least one light pipe lip passes at least one lamp assembly lip.

18. The lamp assembly of claim 16 further comprising a light emitting diode.

19. The lamp assembly of claim 16 further comprising a cover.

20. The lamp assembly of claim 16 further comprising a wire retention device.

21. The lamp assembly of claim 16 further comprising a cover having a wire retention device incorporated therein.

22. The lamp assembly of claim 16 further comprising electrical components, the electrical components including:
   a primary light source; and
   wiring electrically connected to the primary light source to channel power to the primary light source.

23. The lamp assembly of claim 16 wherein a lamp assembly portion accommodating the light pipe is at an angle to at least a portion of the remaining lamp assembly, thereby reducing the maximum dimension of the lamp assembly as compared to a linear configuration.

24. The lamp assembly of claim 23 wherein the angle is a right angle.

25. A lighting assembly comprising the lamp assembly of claim 16 and a light pipe configured to function in conjunction with the lamp assembly.

26. A lighting assembly comprising:
   a light pipe including a primary light source and having an exterior protrusion wherein the protrusion functions as a secondary light source; and
   a lamp assembly comprising:
      a receiving portion having one or more lips;
      wherein when the light pipe is inserted into the lamp assembly receiving portion, the lamp assembly receiving portion expands to allow at least one of the one or more light pipe lips to pass at least one of the one or more lamp assembly lips, so that the lamp assembly at least partially contracts, thereby securing at least one light pipe lip behind at least one lamp assembly lip.

27. A method of manufacturing a light pipe wherein the light pipe has a light pipe section and exterior protrusion, such that the exterior protrusion functions as both a secondary light source and an alignment component the method comprising:
   co-extruding the light pipe section and the exterior protrusion.

28. The method of claim 27 wherein the exterior protrusion and the light pipe section are comprised of like materials.

29. The method of claim 27 wherein the exterior protrusion and the light pipe section are comprised of different materials.

30. A lamp assembly for use with a light pipe, the lamp assembly comprising:
   an opening to accommodate the light pipe; and
   one or more slits to allow expansion of the opening;
   wherein at least one interior dimension of the opening is smaller than at least one exterior dimension of the light pipe;
   wherein insertion of the light pipe into the lamp assembly causes the opening to expand sufficiently to accommodate the light pipe and provide a retention force on the light pipe; and
   wherein the retention force on the light pipe retains the light pipe in the lamp assembly while allowing the light pipe to be rotated.

31. The lamp assembly of claim 30 wherein at least one slit extends longitudinally from the opening.

32. The lamp assembly of claim 30 further comprising a light emitting diode.

33. The lamp assembly of claim 30 further comprising a cover.

34. The lamp assembly of claim 30 further comprising a wire retention device.

35. The lamp assembly of claim 30 further comprising a cover having a wire retention device incorporated therein.

36. The lamp assembly of claim 30 further comprising electrical components, the electrical components including:
   a primary light source; and
   wiring electrically connected to the primary light source to channel power to the primary light source.

37. A lighting assembly comprising the lamp assembly of claim 30 and a light pipe configured to function in conjunction with the lamp assembly.

38. The light assembly of claim 30 wherein a lamp assembly portion accommodating the light pipe is configured at an angle that is not linear with respect to at least a portion of the remaining lamp assembly, thereby reducing the maximum dimension of the lamp assembly as compared to a linear configuration.

39. The light assembly of claim 38 wherein the angle is a right angle.

* * * * *